United States Patent
Klackmann-Schneider et al.

(10) Patent No.: US 10,661,548 B2
(45) Date of Patent: May 26, 2020

(54) METHOD FOR PRODUCING A RESILIENT FLOOR COVERING WITH A PRINTED DECORATIVE LAYER

(71) Applicant: TARKETT GDL, Lentzweiler (LU)

(72) Inventors: Klas Klackmann-Schneider, Wiltz (LU); Igor Brankov, Wiltz (LU)

(73) Assignee: Tarkett GDL, Lentzweiler (LU)

( * ) Notice: Subject to any disclaimer, the term of this patent is extended or adjusted under 35 U.S.C. 154(b) by 507 days.

(21) Appl. No.: 15/359,078

(22) Filed: Nov. 22, 2016

(65) Prior Publication Data
US 2017/0144427 A1    May 25, 2017

(30) Foreign Application Priority Data

Nov. 25, 2015   (LU) .......................................... 92885

(51) Int. Cl.
*B32B 38/14*    (2006.01)
*B32B 38/00*    (2006.01)
(Continued)

(52) U.S. Cl.
CPC ............ *B32B 38/145* (2013.01); *B32B 27/08* (2013.01); *B32B 27/304* (2013.01); *B32B 37/14* (2013.01);
(Continued)

(58) Field of Classification Search
CPC ..... B32B 38/145; B32B 27/08; B32B 27/304; B32B 37/14; B32B 38/0008; B41M 5/0064; B41M 7/0081; E04F 15/16; E04F 15/163
(Continued)

(56) References Cited

U.S. PATENT DOCUMENTS 3,929,545 A  *  12/1975  Van Dyck .............. B27N 7/005
                                                                   156/220
8,398,229 B2 *   3/2013  Vosahlo ................. B41J 11/002
                                                                   101/424.1
(Continued)

FOREIGN PATENT DOCUMENTS

EP    0 957 045 A1    11/1999
EP    1 449 789 A1     8/2004
(Continued)

*Primary Examiner* — Michael N Orlando
*Assistant Examiner* — Elizabeth Bradford
(74) *Attorney, Agent, or Firm* — Reinhart Boerner Van Deuren P.C.

(57) ABSTRACT

A method for producing a printed resilient floor covering includes digitally printing a decorative layer onto the top surface of a support layer or the bottom surface of a wear layer with a UV curable ink; UV curing the printed decorative layer; laminating the support layer and the transparent wear layer together so that the printed decorative layer is sandwiched between the support layer and the transparent wear layer. Alternatively, the method comprises: digitally printing a decorative layer onto a decorative layer support film with a UV curable ink; UV curing the printed decorative layer on the decorative layer support film; laminating a support layer, the decorative layer support film and a transparent wear layer together, so that the decorative layer support film with the printed decorative layer is sandwiched between the support layer and the transparent wear layer.

23 Claims, 3 Drawing Sheets

(51) Int. Cl.
- *B32B 27/08* (2006.01)
- *B41M 7/00* (2006.01)
- *B41M 5/00* (2006.01)
- *E04F 15/16* (2006.01)
- *B32B 27/30* (2006.01)
- *B32B 37/14* (2006.01)

(52) U.S. Cl.
CPC ....... *B32B 38/0008* (2013.01); *B41M 5/0047* (2013.01); *B41M 5/0064* (2013.01); *B41M 7/0081* (2013.01); *E04F 15/16* (2013.01); *E04F 15/163* (2013.01); *B32B 2305/72* (2013.01); *B32B 2307/72* (2013.01); *B32B 2451/00* (2013.01); *B32B 2471/00* (2013.01)

(58) Field of Classification Search
USPC .......................................... 156/272.2, 275.5
See application file for complete search history.

(56) References Cited

U.S. PATENT DOCUMENTS

| | | |
|---|---|---|
| 2010/0278454 A1 | 11/2010 | Huffer |
| 2013/0067842 A1* | 3/2013 | Meersseman ............. B32B 7/12 52/309.4 |
| 2013/0177263 A1 | 7/2013 | Duan et al. |

FOREIGN PATENT DOCUMENTS

| | | |
|---|---|---|
| EP | 2 145 756 A1 | 1/2010 |
| EP | 2 243 716 A1 | 10/2010 |
| EP | 2 347 972 A1 | 7/2011 |
| FR | 3010428 A1 | 3/2015 |
| WO | WO 98/22367 A1 | 5/1998 |
| WO | WO 2004/042168 A1 | 5/2004 |
| WO | WO 2005/123535 A1 | 12/2005 |
| WO | WO 2008/051813 A1 | 5/2008 |
| WO | WO 2008/062159 A1 | 5/2008 |
| WO | WO 2008/115693 A1 | 9/2008 |
| WO | WO 2010/080810 A1 | 7/2010 |
| WO | WO 2010/126618 A1 | 11/2010 |
| WO | WO 2011/032064 A1 | 3/2011 |
| WO | WO 2011/069575 A1 | 6/2011 |
| WO | WO 2011/110272 A1 | 9/2011 |

* cited by examiner

METHOD FOR PRODUCING A RESILIENT FLOOR COVERING WITH A PRINTED DECORATIVE LAYER

CROSS-REFERENCE TO RELATED PATENT APPLICATIONS

This patent application claims the benefit of Luxembourg Patent Application No. 92885, filed on Nov. 25, 2015, the entire teachings and disclosure of which are incorporated herein by reference thereto.

TECHNICAL FIELD

The present invention generally relates to a method for producing a resilient floor covering with a printed decorative layer. It relates more particularly to such a method in which the decorative layer is digitally printed with a solvent free ink, using in particular, an inkjet printer operated with a UV curable ink, which is UV cured, before being sandwiched between a support layer and a transparent wear layer.

BACKGROUND ART

Such a process is described e.g. in FR 3010428 A1. This document discloses a method for producing a resilient floor covering comprising a multilayer structure including a transparent wear layer, preferably consisting of polyvinylchloride (PVC) and/or polyurethane (PU) and/or a polyolefin, and a support layer consisting of a thermoplastic resin, preferably a polyvinylchloride (PVC) and/or polyolefin resin. A decorative layer is digitally printed onto the top surface of the support layer or the bottom surface of the wear layer using an inkjet printer operated with a solvent-free ink that can be cured by energy supply. This solvent-free ink layer is then cured by energy supply, in particular by UV radiation. At least one connecting layer, which consists of an emulsion of acrylic or urethane and/or an acrylic copolymer, is bonded to the cured solvent-free ink layer. This connecting layer serves as a connection between the cured solvent-free ink layer and the underside of the wear layer or the upper side of support layer. Indeed, a cured solvent-free ink layer is—according to the teaching of FR 3010428 A1—not chemically compatible with preferred polymer support layers and/or preferred polymer wear layers in a multilayer resilient floor covering, so that laminating such a cured solvent-free ink layer directly between such functional layers of the resilient floor covering would result in a rapid delamination of the resilient floor covering. Therefore, FR 3010428 A1 proposes to cover the cured decorative layer on the support layer, respectively the wear layer, with a connecting layer that is chemically compatible with the cured solvent-free ink layer and the wear layer, respectively the support layer, to which it is to be connected in the resilient floor covering.

A general object of the present invention is to simplify production of a resilient floor covering with a decorative layer that is printed with a solvent free ink.

A more specific object underlying the present invention is to achieve a durable adhesion between a polymer support layer, a transparent polymer wear layer and a decorative layer that is printed with a UV curable ink and sandwiched between the support layer and the wear layer, without having to use an auxiliary connection layer as disclosed in FR 3010428 A1.

SUMMARY OF INVENTION

In accordance with a first embodiment of the invention, a method for producing a printed resilient floor covering comprises the steps of: providing a polymer support layer and a transparent polymer wear layer; digitally printing a decorative layer onto the top surface of the support layer and/or onto the bottom surface of the wear layer with a UV curable ink; UV curing the printed decorative layer; and laminating the support layer and the transparent wear layer together, so that the printed decorative layer is sandwiched between both; wherein the UV curing is carried out with UV LED sources having a spectral emission in the range of 345-420 nm, so that at the end of the curing step the UV curable ink is still incompletely cured.

In accordance with a second embodiment of the invention, a method for producing a printed resilient floor covering comprises the steps of: providing a polymer support layer, a transparent polymer wear layer and a thin decorative layer support film; digitally printing a decorative layer onto the decorative layer support film with a UV curable ink; UV curing the printed decorative layer; and laminating the decorative layer support film between the support layer and the wear layer so that it is sandwiched between both; wherein the UV curing is carried out with UV LED sources having a spectral emission in the range of 345-420 nm, so that at the end of the curing step the UV curable ink is still incompletely cured.

It will first be appreciated that UV LED curing with a narrow emission spectrum around a central wave length (e.g. 365 nm or 395 nm) the range of 345 nm to 420 nm (UV-A and UV-V region), produces a more homogenous curing over the whole thickness of the decorative layer than traditional curing with mercury arc lamps. A "more homogenous curing" here means that cross-linking progresses more homogenously over the whole thickness of the decorative layer. UV curing with mercury lamps results indeed in a rather inhomogeneous progress of the ink curing. This is mainly due to its much broader emission spectrum, also covering the UV-B and UV-C regions. For example, the curing of the ink surface directly exposed to UV light in the UV-B and UV-C regions is already complete when the curing of the ink core below this surface is still insufficient to warrant the required cohesion of the decorative layer. However, this is not the case for UV LED curing with a narrow emission spectrum in the range of 345 nm to 420 nm (UV-A and UV-V region). The latter warrants indeed a relatively homogeneous curing progress of the decorative layer and avoids an early "closing" of the ink surface.

Furthermore, because of the UV LED sources having a narrow emission spectrum in the range of 345 nm to 420 nm (UV-A and UV-V region), progress of the curing is much easier to control, i.e. the degree of cross-linking finally achieved in the decorative layer is easier to control too.

The degree of cross-linking finally achieved in the decorative layer (i.e. the ink layer) can be modified by acting, for example, on one or more of the following parameters: the type and quantity of photo-initiators in the UV curable ink; the emission spectrum of the UV LED sources; and the radiation density or dose, i.e. the UV energy arriving at the surface per unit area (Joules/cm$^2$). The radiation density is the radiation intensity (i.e. the UV power measured at the irradiated surface per unit area (W/cm$^2$)), which is integrated over the UV exposure time, i.e. the time during which a unit area of the surface of the decorative layer to be cured is exposed to the UV radiation. In case of a continuous production line through which the layer/film bearing the decorative layer to be cured travels with a velocity v, the UV exposure time will depend from the longitudinal extension (in the direction of movement) of the zone irradiated by the UV LED sources and the speed with which the decorative layer to be cured travels through this field.

The proposed invention takes advantage of this enhanced control possibility of the curing progress to control curing progress of the UV curable ink so that at the end of the curing step the ink is still incompletely cured. In other words, UV LED curing of the ink is controlled in such a way to achieve a degree of crosslinking of the ink that is below the degree of crosslinking that would be required for achieving a durable, scratch resistant printed decorative layer.

In this context, the present inventor has more particularly discovered that—surprisingly:

(a) the subsequent lamination step will not significantly affect print quality of the still incompletely cured decorative layer;
(b) despite the still incompletely cured printed decorative layer between the wear layer and the support layer of the resilient floor covering, a sufficient peel adhesion between the different layers of the final resilient floor covering can nevertheless be achieved; and
(c) the fact that in the final resilient floor covering, the printed decorative layer sandwiched between the support layer and the wear layer is only incompletely cured, does not significantly affect durability, wear resistance and print image quality of the final resilient flooring product.

The homogenous progress of cross linking in the decorative layer during curing and the premature stop of the cure before the surface of the ink is closed, allow to achieve a higher flexibility of the decorative layer and a better adhesion between the decorative layer and the support layer and/or the wear layer and/or the decorative layer support film, while nevertheless allowing to warrant a sufficient cohesion inside the decorative layer. The narrow emission spectrum around a central wave length (e.g. 365 nm or 395 nm) the range of 345 nm to 420 nm (UV-A and UV-V region) makes it relatively easy to warrant a more "open" structure of the printed layer, which has a good adhesion to the other layers, while nevertheless having a sufficient cohesion inside the decorative layer.

Furthermore, as the proposed incomplete UV LED curing is generating by far less heat than standard UV curing and, in particular, UV curing with a mercury lamp, the decorative layer may be advantageously printed on a thin and non-reinforced printable decorative layer support film (film thickness in the range 0.09 mm-0.18 mm). This decorative layer support film is then laminated between the support layer and the wear layer, so that the printed decorative layer is sandwiched between the support layer and the transparent wear layer. More preferably, the decorative layer support film is laminated onto the support layer and the wear layer is laminated onto the incompletely cured decorative layer of the decorative layer support film.

Further advantageous features of the invention are:

The decorative layer support film is advantageously laminated onto the support layer and the wear layer is laminated onto the incompletely cured decorative layer of the decorative layer support film.

The decorative layer support film is advantageously a plasticized PVC film, preferably including: 10-50 wt. % of a filler material, preferably mainly calcium carbonate; and/or 2-20 wt. %, preferably 10-20 wt. %, of titanium dioxide, and/or 2-20 wt. %, preferably between 10-20 wt. %, of softening polymers, in particular PLA, PMMA or PVAC.

The decorative layer support film has a thickness preferably in the range of 0.09 mm-0.18 mm.

Digitally printing is preferably carried out with an inkjet printer.

The support layer is advantageously a plasticized PVC layer, preferably including: 20-50 wt. % of a filler material, preferably mainly calcium carbonate; and wherein the support layer preferably has a specific weight in the range of 2000-2300 g/m$^2$; and/or a thickness in the range of 1.0 mm-1.5 mm, preferably in the range of 1.1 mm-1.3 mm.

The wear layer is preferably a plasticized PVC layer without filler, which has a specific weight preferably in the range of 400-600 g/m$^2$ and a thickness preferably in the range of 0.35 mm-0.8 mm.

The wear layer preferably has a K-value less than 70 and/or a content of plasticizer in the range of 3 PHR-30 PHR; and wherein the melting/fusion point of the wear layer is preferably lower than 180° C., more preferably lower than 160° C.

The UV curable ink is preferably deposited with a specific surface density in the range of 5-15 g/m$^2$ onto the respective layer or film surface.

The peak intensity of the UV radiation at the surface of the decorative layer is in the range from 1 W/cm$^2$ to 10 W/cm$^2$, preferably from 2 W/cm2 to 8 W/cm2.

After the curing step, the percentage of cure is still below 90%, preferably in the range of 40% to 80%.

The UV dose per area unit of the decorative layer is adjusted so as to achieve a degree of partial curing resulting in a decorative layer structure with sufficient internal cohesion but still sufficiently open to warrant an adequate adhesion with the other layers.

BRIEF DESCRIPTION OF DRAWINGS

The afore-described and other features, aspects and advantages of the invention will be better understood with regard to the following description of an embodiment of the invention and upon reference to the attached drawings, wherein.

DETAILED DESCRIPTION OF DIFFERENT EMBODIMENTS OF THE INVENTION

It will be understood that the following description and the drawings to which it refers describe by way of example several embodiment of the proposed invention for illustration purposes. This description of preferred embodiments shall not limit the scope, nature or spirit of the claimed subject matter.

FIG. 1A-1D illustrate a first embodiment of the proposed method for producing a resilient floor covering with a printed decorative layer.

Figure 1A:
FIG. 1A-1D: are schematic cross-sections of different layers or layer assemblies illustrating successive steps of a first embodiment of the proposed method for producing a resilient floor covering with a printed decorative layer.

First a polymer support layer 10 is provided (FIG. 1A). A typical support layer is e.g. a plasticized PVC sheet (or a polyolefin sheet), with a thickness in the range of 1 to 2 mm, preferably in the range of 1.1 to 1.5 mm, and more preferably in the range of 1.1 to 1.3 mm, comprising for example 20% to 50% of a filler material, mainly calcium carbonate, and having a specific weight in the range of 1500 to 3000 g/m², preferably in the range of 2000 to 2300 g/m². The polymer support layer 10 may be glass fiber reinforced.

Figure 1B:
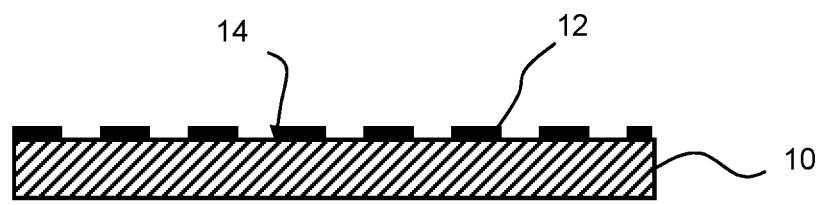

As illustrated in FIG. 1B, a decorative layer 12 is printed on the top surface 14 of the support layer 10. Prior to printing on this top surface 14, the latter may advantageously be provided with a coating, such as e.g. water based acrylic coating containing an acrylic base polymer and/or silica and/or titaniumdioxide and/or other additives. Printing is carried out with a digital printer an industrial inkjet printer using UV curable inks, preferably inks with photo-initiators optimized for a UV spectrum in the range of 345-420 nm. A suitable UV curable ink is e.g. available from AGFA, Collins Inks, 3M, Hymmen or others. The fluid ink has a relative density that is preferably in the range of 1 to 1.6. It is preferably deposited with a specific surface density in the range of 5 to 15 g/m² resulting in an applied thickness after curing of 10 to 25 μm.

Figure 1C:
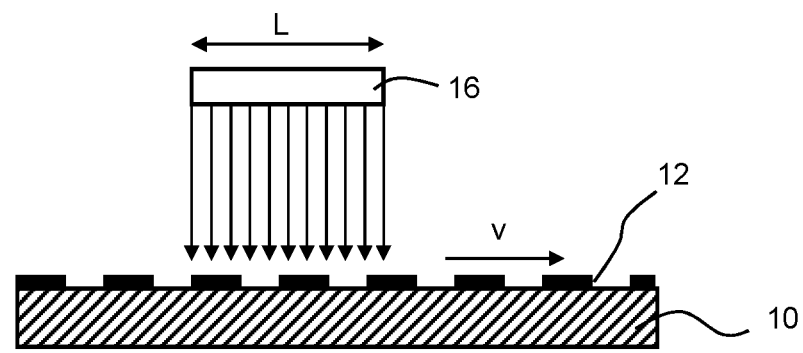

As illustrated in FIG. 1C, the printed decorative layer 12 is thereafter cured with UV LED sources 16 having a narrow spectral emission around a central wave length in the range of 345-420 nm. Suitable LED sources are e.g. LEDs, having a central wave length of 365, 385, 395 or 405 nm is preferably in the range of 1 W/cm² to 10 W/cm². UV exposure time is determined so as to achieve a degree of partial curing resulting in an decorative layer structure with sufficient internal cohesion but still sufficiently open to warrant a sufficient adhesion with the other layers. In case of a continuous production line through which the layer/film bearing the decorative layer to be cured travels with a velocity v, the UV exposure time will be determined by the longitudinal extension (in the direction of movement) of the zone irradiated by the UV LED sources and the speed with which the decorative layer 12 to be cured travels through this field.

It will be noted that the final degree of curing of the ink is influenced by many parameters, for example:
 the chemical composition of the ink;
 the type and quantity of photo-initiators;
 the type and quantity of pigments in the ink;
 the reflectance of the UV radiation at the ink surface;
 the thickness of the ink layer; . . .
 the UV wavelength (nm);
 the UV intensity (W/cm²); and
 the UV dose (Joule/cm²).

Generally, for given ink compositions and photo-initiators, a given decorative layer layout and a given UV wavelength (nm), the minimum UV dose that is required for achieving a complete curing of the decorative layer is determined. Thereafter this UV dose is reduced so as to achieve a degree of partial curing resulting in a decorative layer structure with sufficient internal cohesion but still sufficiently open to warrant an adequate adhesion with the other layers. Reducing of the UV dose can e.g. be achieved by reducing UV intensity (W/cm²) of the UV Led sources 16 (e.g. by dimming the latter or by using filters) and/or by increasing the distance between the UV Led sources 16 and the decorative layer 12 and/or by reducing the UV exposure time. In case of a continuous production line, reducing the UV exposure time can e.g. be achieved by increasing the speed v with which the decorative layer 12 to be cured travels through the UV radiation field and/or by reducing the longitudinal extension L (in the direction of movement) of the zone irradiated by the UV LED sources 16.

The degree of cure of the ink at the end of the curing step may be determined indirectly, e.g. by using a surface hardness test (shore test) or a cross hatch test on the decorative layer 12. In the cross hatch test, a cross hatch pattern is made though the ink layer to the support layer. A pressure-sensitive adhesive tape is applied over the crosshatch cut. The tape is removed by pulling it off rapidly back over itself close to an angle of 180°. Adhesion is usually assessed on a 0 to 5 scale. The more ink has been detached, the higher the value on the scale and the more incomplete the curing of the ink is. A reference table is used to evaluate the result of the test.

A percentage of cure of the ink can also be determined directly, for example by Fourier transform infrared spectroscopy (FT-IR). This test is based infrared radiation absorption by chemical bonds. Each bond type has a distinctive response at a given wavenumber where the height of the peak represents the number of bonds. As the polymer chain is formed during curing, the peak decreases and finally disappears. This FT-IR test allows the measurement of cross-linking progress (i.e. the percentage of cross-linking achieved as a function of time).

It remains to be noted that printing and UV curing advantageously take place under a nitrogen atmosphere. This nitrogen atmosphere still further improves a homogenous progress of the curing in the decorative layer 12 by preventing oxygen inhibition at the surface of the decorative layer.

Figure 1D:
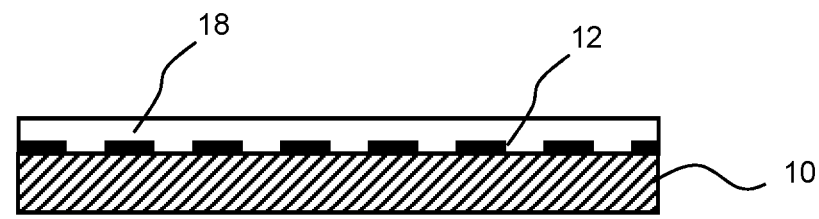

As illustrated in FIG. 1D, after having accomplished the incomplete UV-curing, a transparent wear layer 18 is laminated onto the support layer 10 bearing the still incompletely cured printed decorative layer 16, so that the latter is sandwiched between the support layer 10 and the transparent wear layer 18.

A suitable wear layer 18 is e.g. a plasticized PVC film (or a polyolefin film) comprising substantially no filler material, having a thickness in the range of 0.2 mm to 1.0 mm, preferably in the range of 0.35 mm to 0.8 mm, and a weight in the range of 300 to 800 g/m², preferably in the range of 400 to 600 g/m². This wear layer 18 advantageously has a relatively low K-value, i.e. a K-value preferably in the range of 56 to 61, and a relatively high content of plasticizers, i.e. a content of plasticizers in the range of 5 PHR-21 PHR. Suitable plasticizers are e.g. DINCH, DOTP or DINP. A relatively low K-value as well as a relatively high content of plasticizer in the PVC warrant a lower melting/fusion point of the wear layer 18. Preferably, the melting/fusion point of the wear layer 18 shall be in the range of 120° C. to 180° C. Indeed, being capable to easily reach the melting point of the wear layer 18 during lamination improves adhesion between the wear layer 18 and the still incompletely cured printed decorative layer 12.

Either a point pressure or time pressure lamination process may be used. When a point pressure process is used, the support layer 10 and/or the wear layer 12 are heated up to lamination temperature either by contact with a heated surface (e.g. by contact with a heated drum surface) or by radiation heating (as e.g. IR heating). Thereafter, the support layer 10 and the wear layer 12 are pressed together in a single contact point (e.g. between two pressure rollers), wherein the still incompletely cured decorative layer 12 is sandwiched between the support layer 10 and the wear layer 12. To enhance adhesion, multiple pressure rollers can be used in series. When a time pressure process is used, all layers that shall be laminated together are introduced into an isobaric pressure equipment (e.g. static short cycle press or continuous belt press, as e.g. an AUMA press). During pressure application, this material sandwich is heated from one or from both sides of the sandwich by contact with a heated surface (as e.g. a heated plate or a heated drum).

Before their introduction to the pressure generating equipment, the support layer 10 and/or the wear layer 12 can be pre-heated. Generally, lamination in an isobaric pressure equipment, such as an AUMA press, will be preferred.

Lamination is conditioned by three parameters: temperature, time and pressure. Temperature is playing the most important role. If a minimum temperature is not reached, the adhesion of the layers will be zero. Pressure is only playing a secondary role with regard to adhesion. Less pressure results in less adhesion, but even a pressure as low as 1 bar can already result in sufficient adhesion, while a pressure of 10 bars is by far not improving adhesion by a factor ten. Due to thermal inertia of the layers, the time parameter has a strong influence on the temperature achieved at the interface between the decorative layer and the wear layer, whereby the time parameter has a strong influence on the lamination result too.

The test to determine the adhesion between the different layers 10, 12, 18 is, for example, a peel strength adhesion test carried out in accordance with DIN EN 431 on a laminated product sample (comprising the support layer 10, the decorative layer 12 and the wear layer 18).

Figure 2A:
FIG. 2A-2D: are schematic cross-sections of different layers or layer assemblies illustrating successive steps of a second embodiment of the proposed method for producing a resilient floor covering with a printed decorative layer.
Figure 2B:
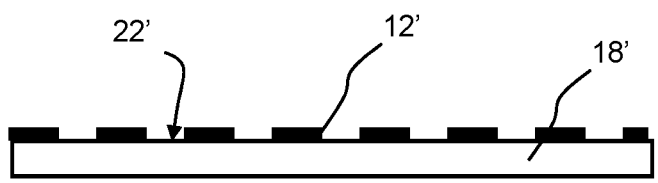
Figure 2C:
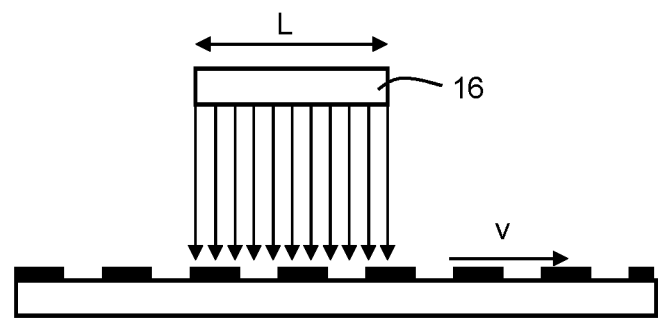
Figure 2D:
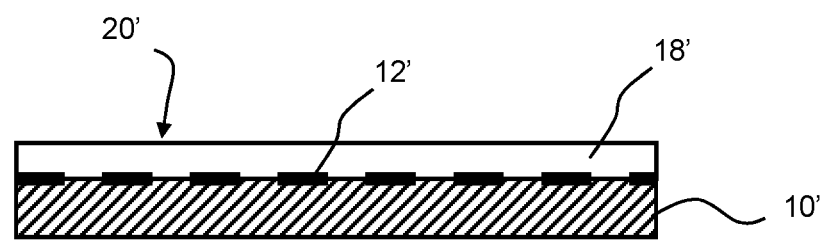

FIG. 2A-2D illustrate a second embodiment of the proposed method for producing a resilient floor covering with a printed decorative layer. In accordance with this second embodiment, first a transparent wear layer 18' is provided (see FIG. 2A), which has a top surface 20' and a bottom surface 22'. As illustrated in FIG. 2B, a decorative layer 12' is printed on the bottom surface 22' of the transparent wear layer 18'. As illustrated in FIG. 2C, the printed decorative layer 12 is thereafter incompletely cured with the UV-LED sources 16. As illustrated in FIG. 2D, the transparent wear layer 18' bearing the still incompletely cured decorative layer 12' is laminated onto a support layer 10', so that the incompletely cured decorative layer 12' is sandwiched between the support layer 10 and the transparent wear layer 18. For further details, about the support layer 10', the wear layer 18', the decorative layer 12', the printing process, the UV curable inks, the incomplete UV LED curing, the lamination of the different layers and the tests to be carried out, one shall refer to the description of the first embodiment of the proposed method provided hereinbefore.

In an alternative embodiment of the proposed second method, a first decorative layer is printed on the top surface of the support layer and a second decorative layer on the bottom surface of the transparent wear layer. Both decorative layers are then incompletely cured as described hereinbefore. Thereafter, the support layer and the wear layer are laminated together, wherein the first decorative layer and the second decorative layer, which are both still incompletely cured, are pressed against each other. In this embodiment, the first decorative layer and the second decorative layer co-operate to form the final design that is visible through the transparent wear layer.

Figure 3A:
FIG. 3A-3D: are schematic cross-sections of different layers or layer assemblies illustrating successive steps of a third embodiment of the proposed method for producing a resilient floor covering with a printed decorative layer.
Figure 3B:
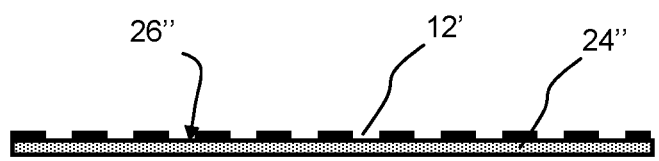
Figure 3C:
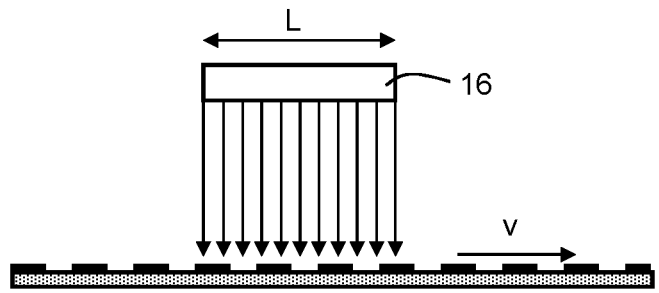
Figure 3D:
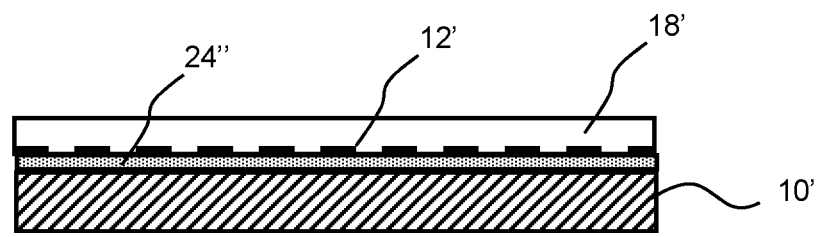

FIG. 3A-3D illustrate a third embodiment of the proposed method for producing a resilient floor covering with a printed decorative layer. According to this method first a thin decorative layer support film 24" is provided (thickness in the range of 0.09 mm-0.18 mm). This decorative layer support film is preferably a plasticized PVC film, including: 10-50 wt. % of a filler material, preferably mainly calcium carbonate; and/or 2-20 wt. %, preferably 10-20 wt. %, of titanium dioxide, and/or 2-20 wt. %, preferably between 10-20 wt. %, of softening polymers, in particular PLA, PMMA or PVAC. It preferably has a whiteness of minimum 92 (L-Value) and an opacity in the range of 95 to 99. As illustrated in FIG. 3B, a decorative layer 12" is printed on the top surface 26" of the decorative layer support film 24". As illustrated in FIG. 3C, the printed decorative layer 12 is then incompletely cured with the UV LED sources 16. As illustrated in FIG. 3D, the decorative layer support film 24" bearing the still incompletely cured decorative layer 12" is thereafter laminated between the support layer 10" and the wear layer 18", wherein the transparent wear layer 18" is directly laminated onto the decorative layer 12". For further details about the support layer 10", the wear layer 18", the decorative layer 12", the printing process, the UV curable inks, the incomplete UV LED curing, the lamination of the different layers and the tests to be carried out, one shall refer to the description of the first embodiment of the proposed method provided hereinbefore.

In an alternative embodiment of the proposed third method, a first decorative layer is printed on the top surface of the decorative layer support film and a second decorative layer is printed on the bottom surface of the transparent wear layer. Both decorative layers are then incompletely cured as described hereinbefore. Thereafter, the support layer, the decorative layer support film and the wear layer are laminated together, wherein the first decorative layer and the second decorative layer, which are both still incompletely cured, are pressed against each other. In this embodiment, the first decorative layer and the second decorative layer co-operate to form the final design that is visible through the transparent wear layer.

LIST OF REFERENCES USED IN THE FIGURES

10, 10', 10" support layer
12, 12', 12" decorative layer
14, 14', 14" top surface of 10
16 UV LED sources
18, 18', 18" transparent wear layer
20, 20', 20" top surface of 18
22, 22', 22" bottom surface of 18
24" decorative layer support film
26" top surface of 24

The invention claimed is:

1. A method for producing a printed resilient floor covering comprising: providing a polymer support layer and a transparent polymer wear layer; digitally printing a decorative layer onto the top surface of the support layer or the bottom surface of the wear layer with a UV curable ink;
   UV curing the printed decorative layer;
   laminating the support layer and the transparent wear layer together so that the printed decorative layer is sandwiched between the support layer and the transparent wear layer; wherein the UV curing is carried out with UV LED sources having a spectral emission in the range of 345-420 nm, so that at the end of the curing step the UV curable ink is still incompletely cured and the UV curable ink remains incompletely cured in the final resilient flooring product.

2. The method as claimed in claim 1, wherein digitally printing is carried out with an inkjet printer.

3. The method as claimed in claim 1:
   wherein the support layer is a plasticized PVC layer, including: 20-50 wt. % of a filler material; and
   wherein the support layer has a specific weight in the range of 2000-2300 $g/m^2$; and/or
   a thickness in the range of 1.0 mm-1.5 mm.

4. The method as claimed in claim 1, wherein the wear layer is a plasticized PVC layer without filler, which has a specific weight in the range of 400-600 g/m² and a thickness in the range of 0.35 mm-0.8 mm.

5. The method as claimed in claim 1, wherein the wear layer has a K-value less than 70 and/or a content of plasticizer in the range of 3 PHR-30 PHR; and wherein the melting/fusion point of the wear layer is lower than 180° C.

6. The method as claimed in claim 1, wherein during digital printing, the UV curable ink is deposited with a specific surface density in the range of 5-15 g/m² onto the respective layer or film surface.

7. The method as claimed in claim 1, wherein the peak intensity of the UV radiation at the surface of the decorative layer is in the range from 1 W/cm² to 10 W/cm².

8. The method as claimed in claim 1, wherein after the curing step, the percentage of cure is still below 90%.

9. The method as claimed in claim 1, wherein the UV dose per area unit of the decorative layer is adjusted so as to achieve a degree of partial curing resulting in a decorative layer structure with sufficient internal cohesion but still sufficiently open to warrant an adequate adhesion with the other layers.

10. The method as claimed in claim 1, wherein after the curing step, the percentage of cure is in the range of 40% to 80%.

11. A method for producing a printed resilient floor covering comprising: providing a polymer support layer, a transparent polymer wear layer and a thin decorative layer support film;
digitally printing a decorative layer onto the decorative layer support film with a UV curable ink;
UV curing the printed decorative layer on the decorative layer support film;
laminating the support layer, the decorative layer support film and the transparent wear layer together, so that the decorative layer support film with the printed decorative layer is sandwiched between the support layer and the transparent wear layer;
wherein the UV curing of the printed decorative layer is carried out with UV LED sources having a spectral emission in the range of 345-420 nm, so that at the end of the curing step the UV curable ink is still incompletely cured and the UV curable ink remains incompletely cured in the final resilient flooring product.

12. The method as claimed in claim 11, wherein the decorative layer support film is laminated onto the support layer and the wear layer is laminated onto the incompletely cured decorative layer of the decorative layer support film.

13. The method as claimed in claim 11, wherein the decorative layer support film is a plasticized PVC film, including:
10-50 wt.% of a filler material; and/or 2-20wt.%, preferably 10-20 wt.%, of titanium dioxide, and/or
2-20 wt.%, of softening polymers.

14. The method as claimed in claim 11, wherein the decorative layer support film has a thickness in the range of 0.09 mm-0.18 mm.

15. The method as claimed in claim 11, wherein digitally printing is carried out with an inkjet printer.

16. The method as claimed in claim 11, wherein the support layer is a plasticized PVC layer, including:
20-50 wt.% of a filler material; and wherein the support layer has a specific weight in the range of 2000-2300 g/m²; and/or
a thickness in the range of 1.0 mm-1.5 mm.

17. The method as claimed in claim 11, wherein the wear layer is a plasticized PVC layer without filler, which has a specific weight in the range of 400-600 g/m² and a thickness in the range of 0.35 mm-0.8 mm.

18. The method as claimed in claim 11, wherein the wear layer has a K-value less than 70 and/or a content of plasticizer in the range of 3 PHR-30 PHR; and wherein the melting / fusion point of the wear layer is lower than 180° C.

19. The method as claimed in claim 11, wherein during digital printing, the UV curable ink is deposited with a specific surface density in the range of 5-15 g/m² onto the respective layer or film surface.

20. The method as claimed in claim 11, wherein the peak intensity of the UV radiation at the surface of the decorative layer is in the range from 1 W/cm² to 10 W/cm².

21. The method as claimed in claim 11, wherein after the curing step, the percentage of cure is still below 90%.

22. The method as claimed in claim 11, wherein the UV dose per area unit of the decorative layer is adjusted so as to achieve a degree of partial curing resulting in a decorative layer structure with sufficient internal cohesion but still sufficiently open to warrant an adequate adhesion with the other layers.

23. The method as claimed in claim 11, wherein after the curing step, the percentage of cure is in the range of 40% to 80%.

* * * * *